(12) United States Patent
Kramarz-Von Kohout

(10) Patent No.: US 8,180,374 B2
(45) Date of Patent: May 15, 2012

(54) METHOD AND SYSTEM FOR TRANSMITTING DATA ON THE LOCATION OF A MOBILE TERMINAL TO A RECEIVER BY MEANS OF A MOBILE RADIO NETWORK

(75) Inventor: Gerhard Kramarz-Von Kohout, Bonn (DE)

(73) Assignee: Deutsche Telekom AG, Bonn (DE)

( * ) Notice: Subject to any disclaimer, the term of this patent is extended or adjusted under 35 U.S.C. 154(b) by 1023 days.

(21) Appl. No.: 11/733,143

(22) Filed: Apr. 9, 2007

(65) Prior Publication Data

US 2007/0232328 A1 Oct. 4, 2007

Related U.S. Application Data

(63) Continuation-in-part of application No. PCT/EP2005/001706, filed on Sep. 27, 2005.

(30) Foreign Application Priority Data

Oct. 8, 2004 (DE) .......................... 10 2004 049 442

(51) Int. Cl.
*H04W 24/00* (2009.01)

(52) U.S. Cl. .................................. 455/456.2; 455/456.1

(58) Field of Classification Search .................. 455/414, 455/456.1–465.6, 456, 457, 562.1, 404.1–404.2, 455/404

See application file for complete search history.

(56) References Cited

U.S. PATENT DOCUMENTS

| | | | | |
|---|---|---|---|---|
| 5,479,482 A * | 12/1995 | Grimes | ...................... | 455/556.1 |
| 5,799,061 A * | 8/1998 | Melcher et al. | .................. | 379/45 |
| 5,835,907 A * | 11/1998 | Newman | ......................... | 707/10 |
| 6,085,097 A * | 7/2000 | Savery et al. | ............... | 455/456.1 |
| 6,477,363 B1 * | 11/2002 | Ayoub et al. | ............... | 455/404.2 |
| 6,697,630 B1 * | 2/2004 | Corwith | ........................ | 455/457 |
| 6,922,565 B2 * | 7/2005 | Rhodes et al. | ............. | 455/456.1 |
| 7,019,646 B1 * | 3/2006 | Woodard et al. | .......... | 340/539.26 |
| 7,177,623 B2 * | 2/2007 | Baldwin | .................... | 455/404.2 |

(Continued)

FOREIGN PATENT DOCUMENTS

DE 19853042 A1 11/1999

OTHER PUBLICATIONS

International Search Report, Dec. 1, 2006.

*Primary Examiner* — Jean A Gelin
*Assistant Examiner* — Nathan Taylor
(74) *Attorney, Agent, or Firm* — The Maxham Firm

(57) ABSTRACT

A method and a system for transmitting data on the location of a mobile radio terminal to a receiver by means of a mobile radio network. An area that lies within the service range of the mobile radio network is defined and is subdivided into several subareas. A plurality of different call numbers are assigned to the receiver, who can be called at each of the call numbers. One respective call number is injectively allocated to the subareas. The location of the mobile radio terminal is determined and is made available to the mobile radio system when a call request is addressed to the receiver by the mobile radio terminal. The determined location is associated with a subarea and thus with a call number of the receiver. A connection between the mobile radio terminal and the receiver is established based on said call number.

12 Claims, 1 Drawing Sheet

U.S. PATENT DOCUMENTS

| | | | |
|---|---|---|---|
| 7,319,403 B2* | 1/2008 | Woodard et al. | 340/632 |
| 7,440,442 B2* | 10/2008 | Grabelsky et al. | 370/352 |
| 7,496,978 B1* | 3/2009 | Begeja et al. | 455/404.1 |
| 2002/0028702 A1* | 3/2002 | Kim | 455/701 |
| 2002/0090957 A1* | 7/2002 | Harris | 455/456 |
| 2002/0098829 A1 | 7/2002 | Tendler | |
| 2003/0050039 A1 | 3/2003 | Baba et al. | |
| 2004/0176106 A1* | 9/2004 | Tendler | 455/456.5 |
| 2005/0003797 A1* | 1/2005 | Baldwin | 455/404.1 |
| 2006/0233318 A1* | 10/2006 | Ashley et al. | 379/45 |

* cited by examiner

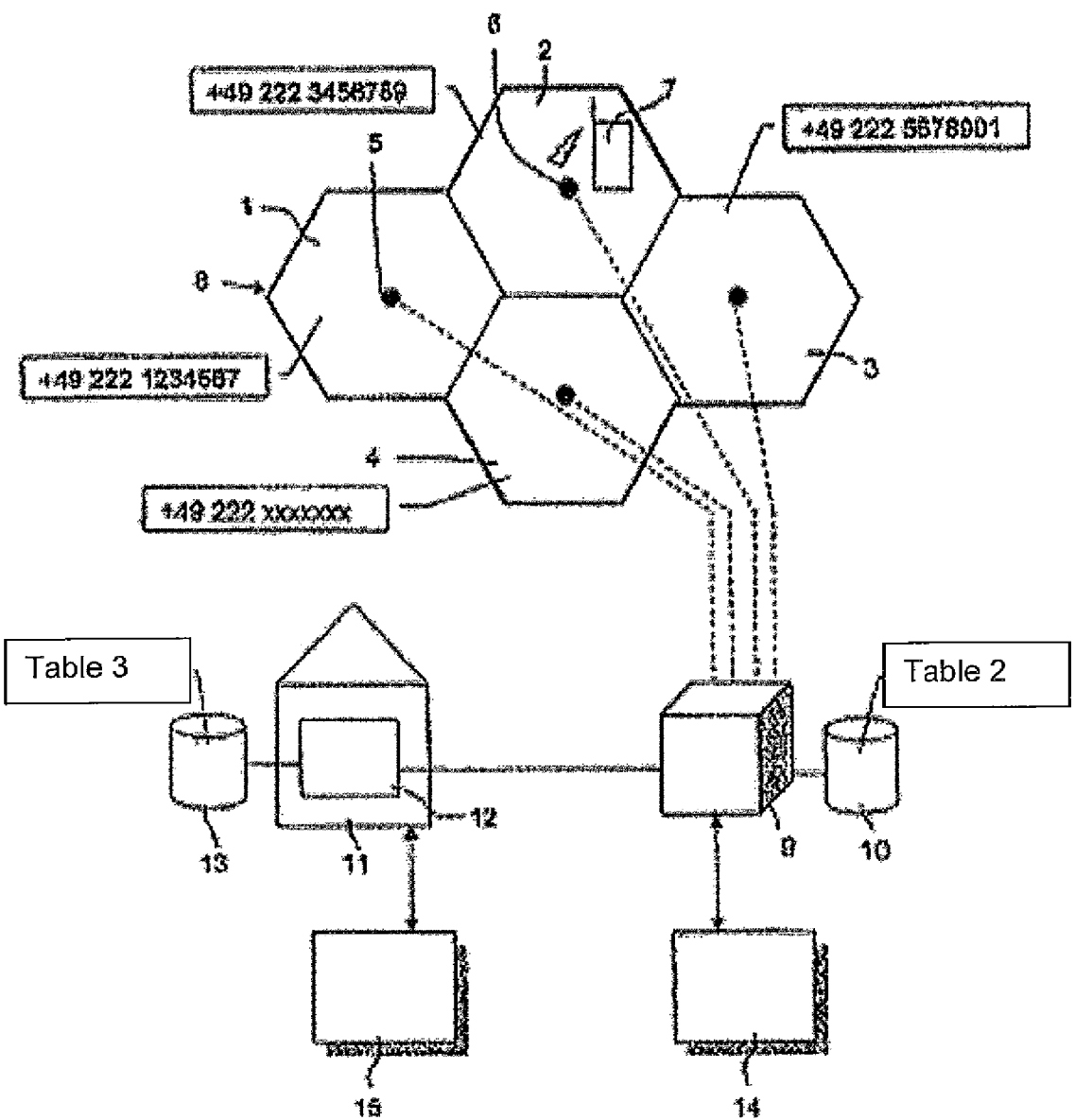

METHOD AND SYSTEM FOR TRANSMITTING DATA ON THE LOCATION OF A MOBILE TERMINAL TO A RECEIVER BY MEANS OF A MOBILE RADIO NETWORK

CROSS REFERENCE TO RELATED APPLICATION

This application is a Continuation-in-Part of International Application No. PCT/DE2005/001706, filed on 27 Sep. 2005, entitled "METHOD AND SYSTEM FOR TRANSMITTING DATA ON THE LOCATION OF A MOBILE RADIO TERMINAL TO A RECEIVER BY MEANS OF A MOBILE RADIO NETWORK."

FIELD OF THE INVENTION

The invention relates to a method and a system for transmitting data on the location of a mobile radio terminal to a receiver by means of a mobile radio network and, for emergency calls, enables easy transmission of location data from a mobile radio network to an emergency call control center.

DISCUSSION OF PRIOR ART

Starting from the situation in the Federal Republic of Germany, two different emergency call carriers are available, namely the police on the one hand and the fire department on the other hand. Nationwide, the police can be reached by dialing 110, the fire department by dialing 112. This also applies to mobile communications, where a mobile radio customer can make an emergency call to 110 or 112 free of charge. Emergency calls can be sent free of charge even via a mobile terminal without SIM (chip card establishing the customer relationship in mobile communications) subscriber module.

The police and fire departments operate local control centers throughout the entire territory of the Federal Republic, which centers are used to process incoming emergency calls. This is intended to ensure that the distance for the responders to the site is not too far.

The transmission of emergency calls from a mobile radio network in Germany is presently implemented from a technical point of view as follows. All local control centers are directly connected to the fixed network of Deutsche Telekom AG. At the switching sites of the mobile radio network, tables are maintained, which store the landline call numbers of the police or fire department control centers responsible for the geographic area of each radio cell that is associated with the service range of a switching site. When a switching site of the mobile radio network receives the emergency call of a mobile terminal, it can determine the radio cell where the emergency call originated from the signaling associated with the emergency call. Based on the table stored at the switching site, the emergency call is then forwarded to the associated control center based on the stored call number. As a result, the locally responsible control center generally receives the emergency call promptly. Direct information on the location of the person making an emergency call from a mobile radio network is not signaled.

The above-described switching of emergency calls, which has been common practice until now, is associated with problems for various reasons. For one, it is not guaranteed that the locally responsible control center in fact receives the emergency call. The radio connection by means of radio cells does not exactly end at political borders. It is possible, for example, that the caller sending the emergency call is located in one state, while his radio connection, at the time the emergency call is made, is established by a radio cell in another state (in relation to the position of the control center reached via the landline call number, which is stored for this radio cell at the switching site). The emergency call carriers are federally organized, meaning when an emergency call extends into another state, it does not reach the control center responsible for the site of the incident. Additionally, the emergency call center receives no data whatsoever in the signaling as to the location from which the emergency call was sent. Even if the mobile radio number of the caller were displayed to the control center (which is not the case for emergency calls without SIM), the center could still not draw any conclusions about the location of the caller because the call is made using a mobile connection. At present, the control center therefore must hope that the caller sending the emergency call is still able to describe the location from which he is making the call which, at a minimum, costs time.

Location-based services in wireless communications, such as WAP services answering the caller's question for the closest gas station, are based on the knowledge of the location of the caller. Services of this type provided today, from a technical point of view, are based exclusively on the knowledge of the radio cell from which a call was sent. Also known are technologies, which—for example based on satellite-supported positioning technologies such as GPS, Galileo—would allow more precise positioning. Their implementation, however, is associated with very high investments for a network operator, so that today cell-based technology continues to be used almost exclusively in Germany.

However, also on the basis of cell-based technology, it is not possible, without some effort in the event of an emergency call, to promptly pass on data on the radio cell from which the emergency call is made to the control center together with the call. Also known are "push techniques," for which in addition and parallel to voice communication a data connection, possibly to one and the same target call number, must be established. In this data channel, the cell data would then be transmitted. In practice, according to information provided by the manufacturers, this is still associated with significant problems because the networks and terminals do not sufficiently support this mode. As an alternative, "pull techniques" are known. In this case, the receiver (control station) requests data on the location from the sender (caller placing the emergency call or mobile radio network). The mobile radio network then provides the location information by means of a data set, which is transmitted to the control center, for example, via a data channel. From a switching engineering point of view, this is associated with fewer effects and problems compared to "push services." However today's technology found in the control centers does not support the "pull services." Furthermore, in terms of time, the performance of a pull method is generally inferior to the performance of a push method because the location data is only available to the receiver during the course of the emergency call (or even afterwards), and not already at the beginning of the emergency call. Manufacturers cite substantial investment requirements for the mobile radio network operators as the reason for the implementation of cell-based pull or push methods.

The European Parliament started quite some time ago to address the topic of providing location information during an emergency call. For example, the European Universal Services Directive ("Directive 2002/22/EC of the European Parliament and the Council from Mar. 7, 2002, on universal service and users' rights relating to electronic communications networks and services") in Article 26, Section 3, requires: "Member States shall ensure that undertakings which operate public telephone networks make caller location information available to authorities handling emergencies, to the extent technically feasible, for all calls to the single European emergency call number '112'." The Federal Republic of Germany has pursued this requirement and implemented it in §108, Section 1, of the new Telecommunications Act TGK from Jun. 25, 2004: "Anyone operating telecommunications networks used for publicly accessible telephone services is obligated to transmit emergency calls, including . . . the data required for determining the location from which the emergency call is made, to the locally responsible emergency call polling station." As a result, mobile radio network operators in Germany are now faced with the technical challenge to comply with this obligation under the emergency call section of the TKG to transmit emergency calls together with the location data.

German patent publication DE 198 53 042 A1 discloses a mobile telephone, particularly for emergencies. While the transmission of location information to an emergency control center is mentioned, it is not specified in detail. The actual location information is converted into data or speech format and transmitted to the emergency control center before establishing the connection.

U.S. Pat. No. 6,477,363 B1 and also US patent publication 2002/0098829 A1 disclose methods for transmitting location information, for example, in connection with emergency calls or bets conducted by a mobile telephone. The location information is detected by GPS in the mobile telephone, converted into audio signals and the audio signals are transmitted to an emergency control center or a betting agency.

SUMMARY OF THE INVENTION

It is therefore a purpose of the present invention to provide a method and a system which solve the above-described problem of non-existent signaling of precise location data, at least in terms of the cell location, to a receiver in mobile radio networks at little expense.

An advantage of the present invention is that it can be implemented in the switching technology of the mobile radio network with little expense. As a result, also the problem of misrouting emergency calls, for example, is reduced because the receiver is provided with direct location information of the emergency caller and thus able, if necessary, to forward the emergency call in a targeted manner.

The invention is implemented based on the push principle. The "promptness" of the transmission of location data required under the new German Telecommunications Act TKG is thus guaranteed. The implementation will be described hereinafter in two variants.

The implementation preferably allows the transmission of precise location data in terms of the cell location, meaning the identity of the radio cell in which the mobile radio terminal is located, using a push method. The expenses associated in the switching technology of the mobile radio network with this implementation can be considered particularly low.

In particular for a mobile radio network, in which it is possible to provide more precise location information on the basis of precisely operating (with cell-precision) positioning techniques—such as on the basis of satellite positioning technology (GPS, Galileo)—in order to determine the location from which an emergency call originates. Furthermore, an addition to the implementation is described, which also transmits location data with arbitrary accuracy to an emergency call polling station using a push method. This method is also suited when specific location data is transmitted via the mobile radio terminal to the mobile radio network. This is conceivable, for example, for mobile radio terminals with an integrated or externally connected GPS receiver. The second variant is basically suited for arbitrary location data, however accurate they may be and however they may be encoded. This implementation, however, is associated with slightly higher expenses for the switching technology.

BRIEF DESCRIPTION OF THE DRAWING

The objects, advantages, and features of the invention will be more clearly perceived from the following detailed description, when read in conjunction with the accompanying drawing, wherein:

FIG. 1 shows a simplified illustration of the technical components required to implement the invention.

DETAILED DESCRIPTION OF THE PREFERRED EMBODIMENTS

The description of an implementation of the inventive idea is provided hereinafter with reference to FIG. 1. The examples hereinbelow describe the scenario of an emergency call made from a mobile radio terminal 7 to an emergency call carrier 11 (receiver), such as the police or fire department. The mobile radio network is illustrated schematically by the radio cells 1, 2, 3 and 4, the base stations 5, 6, and a mobile switching station 9. Of course, each radio cell 1, 2, 3, 4 is associated with at least one base station. According to the invention, together with the emergency call, data on the location of the mobile radio terminal 7 is automatically transmitted to the emergency call carrier 1, based on which data prompt, targeted aid can be dispatched. The description addresses both the side of the mobile radio network or the switching technology thereof or both, and the side of the emergency call carrier (police, fire department) or the technology of the same, or both.

PREFERRED EMBODIMENT OF THE INVENTION

Prerequisite:
From the switching technology, the mobile radio network has knowledge of the identity of the radio cell at which the emergency call connection originates. This information needs to be signaled to the control center.

Implementation:
As described, at the switching sites 9 (MSC) of the mobile radio network or databases 10 connected thereto, or both, tables are maintained which, for each radio cell 1, 2, 3 and 4 that is associated with the service range of a switching site 9, store the landline call numbers of the control centers 11 of the police or fire department control centers responsible for the geographic area of the radio cell.

Such a table (inside the switching site), in a simplified illustration, has the set-up reflected in Table 1:

TABLE 1

| Radio Cell Number | Landline Call number Police "110" | Landline Call number Fire Department "112" |
|---|---|---|
| Cell 1 | +49 228 1234567 | +49 228 7654321 |
| Cell 2 | +49 228 3456789 | +49 228 8765432 |
| Cell 3 | +49 228 1234567 | +49 228 7654321 |
| . . . | . . . | . . . |

According to this example, a 110 emergency call, which is sent to this switching site via the radio cell 1, is forwarded to the landline call number +49 228 1234567 based on the dialed number "110." A 112 emergency call, which is sent to this switching site via the radio cell 1, is recognized as an emergency call based on the "emergency call" signaling and forwarded to the landline call number +49 228 7654321. However, to remain within the scope of this example, also the emergency calls from cell 3 are forwarded to precisely these landline call numbers, for example, because the service ranges of the two radio cells 1 and 3 are within sufficient proximity to each other and for this reason the same control centers are responsible for the emergency call. The service range of radio cell 2, however, may be so far away that different control centers may be responsible for this cell. For simplicity reasons, the cells here have been numbered consecutively; in fact, radio cells in wireless communication are unambiguously (within a mobile radio network) identified by certain cell identifiers (CI).

If the association between the "radio cell number" and the landline call numbers of the control center 11 of the police or fire department were injective, meaning, unlike in the above example, two different radio cells out of 1, 2, 3, 4 were associated with two different landline call numbers, the control center 11 having knowledge of the "dialed" call number, meaning the call number to which the switching site 9 forwarded the emergency call, could draw a conclusion of the associated radio cell, assuming that the control center has a complete overview of the association table.

For example, the following association Table 2 could be provided:

TABLE 2

| Radio Cell Number | Landline Call number Police | Landline Call number Fire Department |
|---|---|---|
| Cell 1 | +49 222 1234567 | +49 222 7654321 |
| Cell 2 | +49 222 3456789 | +49 222 8765432 |
| Cell 3 | +49 222 5678901 | +49 222 9876543 |
| ... | ... | ... |

An evaluation that is performed, for example, by the control center 11 of the police, would produce the results showed in simplified form in Table 3:

TABLE 3

| Call number dialed | Radio Cell Number |
|---|---|
| +49 222 1234567 | Cell 1 |
| +49 222 3456789 | Cell 2 |
| +49 222 5678901 | Cell 3 |
| ... | ... |

If the control center 11 of the police furthermore received data from the mobile radio network operator (offline) on the location of the radio cells 1, 2, 3, 4 or of the base stations 5, 6 handling these radio cells, for example in the form of geographic coordinates of a certain coordinate system such as UTM Ref., as well as other characteristics, such as the power, sectoring, the center can draw a conclusion from the number of the radio cell about the location of the sender technology of the cell and from this about the location of the mobile radio terminal 7 or of the person sending the emergency call, or both.

This association between the "dialed" call number of the emergency call arriving at the control center and the corresponding geographic position information (radio cell) can also be automated if the control center electronically captures the information obtained offline from the mobile radio network operator for further processing. In detail, the invention involves the following method-related steps and technical installations at the involved parties:

1) Administrative offices 15 of the emergency call carriers (police, fire department) inform the mobile radio network operators about control centers 11 they operate and their local responsibilities (service area 8).
2) Mobile radio network operator 14 informs the emergency call carrier about the number of radio cells 1, 2, 3 and 4 operated in the service range of the respective control centers.
3) Technical installation 12 of control center 11 preferably includes one or more telecommunications systems (TK systems), preferably one private branch exchange, which supports a separate call number that can be dialed from the outside (see Table 2) for each mobile radio network operated in the service range and for each radio cell that is the local responsibility of control center 11. This call number association is stored, for example, in database 13. For example, if four mobile radio network operators are in business in the country and the first one operates 80 radio cells in the service range of the control center, the second 70, the third 100 and the fourth 110, at least 360 call numbers must be associated with the TK system to allow a clear differentiation of all radio cells of all mobile radio network operators in service area 8.
4) Control center 11 informs the mobile radio network operators about the call numbers they should use (Table 2).
5) Each mobile radio network operator 14, definitely invectively, assigns the available call numbers to the radio cells 1, 2, 3 and 4 it operates in service area 8 and stores these associations in database 10. Third generation mobile radio networks, such as UMTS, use very small radio cells, referred to as picocells, having a diameter of less than 100 m, particularly in urban areas. According to the invention, a call number can be associated with a plurality of adjacent cells, which are combined to a larger network.
6) Mobile radio network operator 14 informs the emergency call carrier 11, 15 about the radio cells 1, 2, 3, 4 it operates in service are 8 and provides in particular location data for each radio cell, meaning:
   a. Coordinates (in a bilaterally coordinated coordinate system) of the location of sender technology 5, 6 (for example "32UPA340756" as UTM Ref. Coordinates);
   b. The call number associated with the radio cell;
   and furthermore, optionally, for example the following details:
   c. cell identifier (CI);
   d. description of the cell (for example Bonn-Beuel III);
   e. postal city and street information (such as Landgrabenweg 151, 53227 Bonn);
   f. sender characteristics (such as power, sectoring).
   In the case of a network (see above step 5), corresponding steps must be carried out (such as coordinates of a suitable location of the network area).
7) TK system 12 of control center 11 must include the "Called Number Identification" feature, so that the dialed call number (here: the number forwarded by switching site 9 in the event of an emergency call) can be recognized.
8) The TK system of control center 11 includes a technical installation, which can associate the corresponding coordinates with the dialed call number according to step (6) and can then provide these coordinates to an output unit (display) for the operators at the control center.

9) Optionally, this technical installation according to step 8 may also be able to provide all optional information (or pieces thereof) according to step 6 to an output unit (display) for the operators.

10) Optionally, this technical installation according to step 8 may also be able to graphically process the coordinates of the location of the sender (base stations 5, 6 according to step 6 and optionally the transmitting characteristics according to step 8) and in this way indicate the location of the sender on a map in a suitable scale. Optionally also this system provides the display of the possible service range of this sender, provided this can be deduced from the sender characteristics.

These steps are performed by all affected mobile radio network operators for all emergency call carriers (police, fire department).

When a mobile radio subscriber 7 now transmits an emergency call to one of the standard call numbers 110 or 112, the switching technology 9 based on the radio cell identifier recognizes the radio cell, for example radio cell 2, in which the emergency call was initiated. If it is an emergency call to 110 for the police, for example, the switching technology 9 forwards the emergency call to the landline number +49 222 3456789 of the appropriate emergency call carrier associated with the radio cell 2, in this example the police, based on Table 2 according to step 5. Control center 11 of the emergency call carrier accepts the emergency call. According to step 7, it recognizes the call number +49 222 3456789 "dialed" by the switching technology and can associate it with the radio cell 2 based on Table 3. According to step 8, the coordinates of the corresponding radio cell 2 can then be displayed to the operators in the control center. Furthermore, additional information according to steps 9 or 10, or both, is provided to the operators of the control center. The operators now have the relevant information to properly process the emergency call and initiate the necessary (rescue) measures.

As a result, also the above-described problem of misrouting an emergency call to a control center that is not locally responsible is reduced. Having knowledge of the radio cell, the control center that is not responsible for the location can easily determine the control center that is in fact responsible, for example, by glancing at the map, based on the possible radio service range of the radio cell signaled, and can optionally forward the emergency call, provided this is technically feasible, to the responsible control center of the neighboring service area.

ADDITIONAL EMBODIMENT OF THE INVENTION

Prerequisite:

From the switching technology, the mobile radio network has knowledge of the coordinates of the location at which the emergency call connection originates, possibly with precision that is greater than the radio cell associated with the emergency call connection. This location information on the mobile radio terminal placing the call could have been determined, for example, by the mobile radio terminal itself using a GPS receiver or by the mobile radio network by means of the propagation time of the radio signals or with the aid of a satellite positioning system. This information needs to be signaled to the control center.

Implementation:

Sole implementation in accordance with the principle of the first embodiment of the invention is no longer recommended when the granularity of the position information becomes too fine because then a correspondingly high (possibly too high) number of telephone connections would be required to guarantee the infectivity of the association required for the described implementation.

For this reason, signaling according to the second embodiment will occur not indirectly by evaluating the dialed call number, but directly through the explicit signaling of the position information in the form of coordinates. This explicit signaling process is carried out according to the invention by suffix dialing, for example, by means of a dual tone multiple frequency dialing method, during an existing telecommunications connection between the person placing the emergency call and the person receiving it.

The dual tone multiple frequency (DTMF) method refers to a method for transmitting the call number. Each key of the terminal is associated with two frequencies. When pressing a key, a tone is produced from the two frequencies associated with the key. When a subscriber dials a call number, hence a sequence of tones based on mixed frequencies is produced.

The method enables more reliable identification of a keystroke than the previously used pulse dial method. In addition, the dual tone multiple frequency method allows the identification of a considerably larger number of keys. While the pulse dial method is limited to the identification of digits, the dual tone multiple frequency method allows the use of special keys such as <*> and <#>, but also letters A, B, C, D to be signaled. As with the pulse dial method, the generated control signals are transmitted within the connecting channel for the transmission of the voice data (for ISDN the B channel). In addition to the transmission of call numbers, the method can be used for configuring TK systems or for controlling services in the telephone network.

The DTMFs (f) standardized for the keys according to ITU-T Q.23 are:

TABLE 4

| f in Hz | 1209 | 1336 | 1447 | 1633 |
|---|---|---|---|---|
| 697 | 1 | 2<br>abc | 3<br>def | A |
| 770 | 4<br>ghl | 5<br>jkl | 6<br>mno | B |
| 852 | 7<br>pqrs | 8<br>tuv | 9<br>wxyz | C |
| 941 | * | 0 | # | D |

All modern mobile (and also other) telecommunications terminals today support DTMF. This way, the characters are dialed to establish a telecommunications connection. It is also possible in this way, however, to dial characters, for example, in wire communications for the control and configuration of the mobile box, when the telecommunications connection has already been established.

The idea according to the invention utilizes the functionality of being able to suffix dial the DTMF characters 0, . . . , 9, A, B, C, D, *, #, during an existing telecommunications connection so as to transmit information, namely, in the case of an emergency call accordingly encoded location data for the location at which the emergency call connection originates. If the location data were already available in the mobile radio terminal, suffix dialing could take place there (for the connection between the mobile radio terminal and the receiver), otherwise suffix dialing is carried out by the switching technology (for the connection between the switching technology and the receiver), provided that such location data is available in the switching technology.

DTMF technology is intended for circuited switched ("CS") networks. Suffix dialing-capable alternatives to DTMF are conceivable, but not common at this time. In the case of packet switched ("PS") networks, "suffix dialing" could be carried out accordingly by packets/data sent subsequently by the terminal or network. The latter is relevant when thinking about an emergency call placed by VoIP ("Voice over IP").

The additional embodiment of the invention, on the one hand, can build on the implementation described for the preferred embodiment, meaning it can be used in addition to the preferred embodiment. This way, the emergency call center in any case would have the cell information available, even if the more precise positioning technology should have failed—"back-up solution"—or if the more precise positioning technology is not available throughout the entire territory of the mobile radio network.

In a variant, the additional embodiment of the invention, however, can also be carried out independently from the implementation described in the preferred embodiment. In this case, it will depend on the agreements made between the mobile radio network and the emergency call polling stations whether routing, meaning the selection of the responsible emergency call polling station, is carried out in a cell-based manner, meaning the radio cell from which the emergency call was transmitted is available in any case to the switching technology, or whether for routing first the more precise (more precise than precision in terms of the cell location) location data is evaluated and the responsible emergency call polling station is selected on the basis of this location data. For this purpose, a corresponding, typically very comprehensive table or a corresponding algorithm must be stored in the switching technology, which supports this selection process. If the second embodiment of the invention is used alone, the control centers 11 in any case only require a single "emergency call number," which can be used to reach them from the outside. This nearly completely eliminates the possibility that the call is routed to a control center that is not responsible, while in principle this is still possible when the caller is in a location directly adjacent to the border of responsibility areas.

The description hereinafter uses routing based on the cell information because the cell information is immediately available in the switching technology, so that the call can be routed immediately and the emergency call can be transmitted promptly. In general, more precise location information has to be determined first, usually via certain positioning servers or GPS positioning methods, so that the transmission of the emergency call would be delayed accordingly. The disadvantage, however, is the slightly greater probability that a call will be routed to a control center that is not in charge, wherein this center receives not only the cell information, but also the more precise location data, which should allow the control center that is indeed in charge to be determined with little effort.

The description provided hereinafter furthermore presupposes the implementation of the preferred embodiment of the invention, so that the control center in any case also has the cell information available. It shall be emphasized again that the additional embodiment of the invention can also be operated alone, meaning independently from the preferred embodiment.

Therefore, in detail the following method and the following technical installations at the involved parties are described.

This method is built on the ten steps from the first example and these ten steps are supplemented with another seven steps:

11) Switching technology 9 in the mobile radio network can promptly determine more precise location data on the caller location (for an emergency call or in general). This can be carried out with familiar positioning measures, such as:
  a. measuring the signal strengths of radio signals of mobile radio terminal 7 received by base stations 5, 6 of the mobile radio network;
  b. measuring the propagation times of the radio signals between mobile radio terminal 7 and base stations 5, 6 of the mobile radio network;
  c. satellite positioning methods, for example, based on GPS or Galileo.

Alternatively, the switching technology 9 has received location data from mobile radio terminal 7.

If necessary, the switching technology is able to convert the location data into a format (for example, a certain coordinate system) that is used in TK system 12 of the control center.

12) Switching technology 9 in the mobile radio network encodes this more precise location data into DTMF-compatible codes (consisting of the 16 possible digits 0, ..., 9, A, B, C, D, *, #).

13) Switching technology 9 in the mobile radio network can suffix-dial the accordingly encoded location data via DTMF when a connection already exists for the emergency call between mobile radio terminal 17 and emergency call control center 11.

14) TK system 12 of the control center includes a technical installation, which detects the suffix-dialed DTMF characters.

15) TK system 12 of the control center includes a technical installation, which is able to decode the suffix-dialed DTMF characters for more precise location data.

16) TK system 12 of the control center includes a technical installation, which provides the more precision location data on an output unit (display) for the operators.

17) TK system 12 of the control center optionally includes a technical installation, which graphically processes the more precision location data and this way displays the caller location on a map in a suitable scale.

With reference to steps 11), 12), and 13), it is possible alternatively that "precise" location information available in mobile radio terminal 7 is formatted directly in the mobile radio terminal and transmitted by the mobile radio terminal as a DTMF signal to emergency call carrier 11 via switching technology 9 of the mobile radio network.

When a mobile radio subscriber, for example, sends an emergency call to 110 or 112, switching technology 9 recognizes radio cell 2 in which the emergency call was initiated. Switching technology 9 forwards the emergency call to the landline number of the associated emergency call carrier 11 based on Table 2 available in database 10 in accordance with step 5.

Control center 11 of the emergency call carrier accepts the emergency call. According to step 7, the center is able to recognize the dialed call number. According to step 8, the coordinates of corresponding radio cell 2 can then be displayed to the operators in the control center. Furthermore, optionally additional information according to steps 9 or 10, or both, is provided to the operators of the control center.

Parallel to this, switching technology 9 (or mobile radio terminal 7) will determine more precise location information about the caller location, for example, by evaluating the signal strength and propagation time measurements of the radio signals received from mobile radio terminal 7 at base stations 5, 6. Switching technology 9 (or mobile radio terminal 7) preferably encodes this information as DTMF-compatible location information available as geographic coordinates and suffix-dials the associated DTMF characters during the existing communications connection between the mobile radio terminal and control center 11 (in accordance with steps 11 to 13).

Control center 11 recognizes the suffix-dialed DTMF characters, decodes them into more precise location information and displays it to the operators, for example, in the form of geographic coordinates. In addition, optionally the operators of the control center are provided with the graphic information according to step 17. This means that the coordinates that were determined are illustrated on a digital map. The operators now have the relevant information to properly process the emergency call and initiate the necessary (rescue) measures.

As already mentioned above, in addition to DTMF suffix dialing methods, other techniques can be used for the invention. For calls or other data connections using packet switched networks, the procedure is accordingly, meaning the location information is transmitted subsequently for example as data packets, in a suitable format for the receiver. Accordingly, the subsequent transmission of location information in the form of data packets can also be used for internet-based connections.

What is claimed is:

1. A method for transmitting data on the location of a mobile radio terminal to a receiver by means of a mobile radio network, comprising the following:
   defining substantially the service range of a radio cell or a certain group of radio cells of the mobile radio network as a subarea;
   assigning a plurality of different call numbers to the receiver, any one of these call numbers being valid for dialing the receiver;
   allocating, respectively, each of these call numbers to one radio cell or certain group of radio cells such that each radio cell or certain group of radio cells has a unique call number;
   determining the radio cell or certain group of radio cells in which the mobile radio terminal is located when a call request is addressed to the receiver by the mobile radio terminal during a call setup procedure wherein the radio cell or certain group of radio cells is determined by evaluating the cell identifier of the radio cell or certain group of radio cells;
   making the subarea of the mobile radio terminal available to the mobile radio system when the call request is addressed to the receiver by the mobile radio terminal;
   associating the determined radio cell or certain group of radio cells with an allocated call number of the receiver;
   establishing a connection between the mobile radio terminal and the receiver based on said allocated call number;
   by the receiver determining the associated radio cell or certain group of radio cells based solely on the allocated call number used for the connection; and
   supplying the receiver with information on the subarea, and thus the approximate location of the mobile radio terminal.

2. The method according to claim 1, wherein in the subareas are located in an area defined by a community limit, city limit, county limit, district limit, state border, or country border.

3. The method according to claim 2, wherein substantially the service range of a certain group of radio cells of the mobile radio network is defined as a subarea.

4. The method according to claim 1, wherein the step of allocating call numbers is done injectively.

5. The method according to claim 1, wherein the subareas are located in an area that substantially comprises the entire service range of the mobile radio network.

6. The method according to claim 1, wherein the subareas are located in an area that substantially comprises a regional service range of a rescue or service organization.

7. The method according to claim 1, wherein substantially the service range of a radio cell of the mobile radio network is defined as a subarea.

8. The method according to claim 1, wherein the call request addressed to the receiver is sent to a standardized call number that differs from the plurality of different call numbers.

9. The method according to claim 1, wherein the association of the determined location with the subarea and the call number assigned to the same is made in the mobile radio terminal.

10. The method according to claim 1, wherein the association of the determined location with the subarea and the call number assigned to the same is made in a power supply element of the mobile radio terminal.

11. The method according to claim 1, wherein location information in the form of a cell identifier is used.

12. A system for transmitting data on the location of a mobile radio terminal to a receiver by means of a mobile radio network, comprising:
   an administrative office and a mobile radio operator for defining substantially the service range of a radio cell or a certain group of radio cells of the mobile radio network as a subarea;
   the administrative office assigning a plurality of different call numbers to the receiver, any one of these call numbers being valid for dialing the receiver;
   the mobile radio operator allocating, respectively, each of these call numbers to one radio cell or certain group of radio cells such that each radio cell or certain group of radio cells has a unique call number;
   a switching site for determining the radio cell or certain group of radio cells in which a mobile radio terminal is located when a call request is addressed to the receiver by the mobile radio terminal while setting up the call wherein the radio cell or certain group of radio cells is determined by evaluating the cell identifier of the radio cell or certain group of radio cells;
   the switching site making the subarea of the mobile radio terminal available to the mobile radio system when the call request is addressed to the receiver by the mobile radio terminal;
   the switching site and a database associating the determined radio cell or certain group of radio cells with an allocated call number of the receiver;
   the switching site establishing a connection between the mobile radio terminal and the receiver at based on said allocated call number; and
   technical installations at the receiver which, based solely on the allocated call number used for the connection, determine the associated radio cell or certain group of radio cells and thus the approximate location of the mobile radio terminal.

* * * * *